(No Model.)
E. SOLVAY.
TREATING PULVERULENT MATERIAL WITH GASES.
No. 503,558. Patented Aug. 15, 1893.
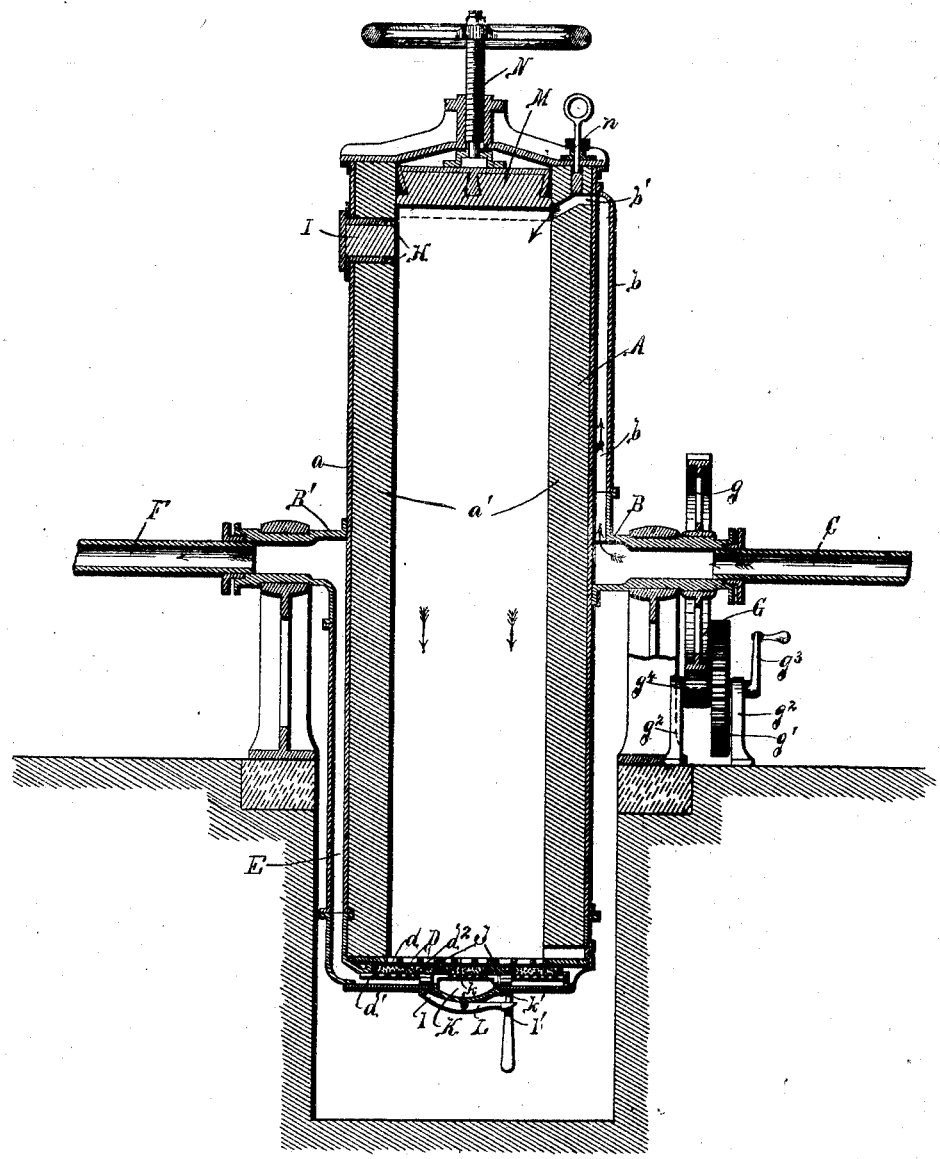
WITNESSES:
W. H. Randall,
H. E. Chase,
INVENTOR
Ernest Solvay
BY
Hey Wilkinson & Parsons
ATTORNEYS.

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

TREATING PULVERULENT MATERIAL WITH GASES.

SPECIFICATION forming part of Letters Patent No. 503,558, dated August 15, 1893.

Application filed November 10, 1890. Serial No. 370,865. (No specimens.) Patented in Belgium April 19, 1889, No. 85,896; in France April 30, 1889, No. 197,853; in England May 28, 1889, No. 8,872, and in Germany June 17, 1889, No. 50,342.

*To all whom it may concern:*

Be it known that I, ERNEST SOLVAY, a citizen of Belgium, residing at Brussels, Belgium, have invented new and useful Improvements in Processes for the Methodical and Continuous Treatment of Pulverulent Material, (for which I have obtained patents in Belgium, No. 85,896, of April 19, 1889; in France, No. 197,853, of April 30, 1889; in Great Britain, No. 8,872, of May 28, 1889, and in Germany, No. 50,342, of June 17, 1889,) of which the following, taken in connection with the accompanying drawing, is a full, clear, and exact description.

My invention relates to an improved process for methodically and continuously treating powdered substances with gases, and consists in passing the gas from the top to the bottom through a body of the powdered material for treating the same, withdrawing the treated material from one extremity of said body, and adding fresh material at the opposite or green extremity, whereby the powdered material gradually reaches the desired condition methodically and continuously, all as hereinafter more particularly described and pointed out in the claim.

In describing this invention, reference is had to the accompanying drawing, forming a part of this specification, in which, like letters indicate corresponding parts.

The drawing illustrates an apparatus suitable for carrying out my process and forming the subject matter of a pending application, Serial No. 347,895, filed April 14, 1890.

It is well known that from the standpoint of industrial method and continuity the typical apparatus when the question is to cause heat and gases to act on a material in small pieces, is the continuous lime kiln; but this apparatus so simple, methodical, continuous and economical, ceases to be useful when the material to be treated is in powdered form. This is caused by the fact that gases circulating in these kilns from bottom to top make for themselves irregular paths in this powdered substance, forming chimneys by which they pass entirely, while outside of the influences of this current there remain whole zones of material, which, owing to their greater resistance to the progress of the gas, are unaffected thereby.

By my improved process I have produced a method adapted to treat powdered substances, and possessing therefor all the advantages of the continuous lime kiln and none of its disadvantages.

Briefly stated, my invention consists in causing the gas to pass from the top to the bottom through the powdered substance, thus causing the weight of the material to prevent the formation of passages of easier resistance; in removing the material sufficiently treated from one end, and adding fresh material at the green end of the substance to be treated.

In order to clearly set forth my process I have shown the apparatus illustrated in the accompanying drawing, which is particularly applicable for treating powdered materials by my improved method.

—A— is a receptacle of suitable form, size and shape, here illustrated as of greater length than width and formed of an outer shell —a— and an inner shell —a'— thereby preventing radiation and loss of heat. Suitably secured to the receptacle —A— are hollow trunnions —B— and —B'— so placed that the receptacle balances and requires but little power for revolution upon the trunnions. Discharging within the trunnion —B— is a gas inlet pipe —C— and opening from said trunnion is the passage —b— extending upwardly to an inlet —b'— in the normal top of the receptacle —A—. As previously set forth the gas traverses the material from top to bottom, and thus passes from the outlet openings —D— in the normal base of said receptacle. There are preferably several of these openings, and, as illustrated, they are formed in a pair of plates —d— and —d'— having a suitable filling or filter —d²— between them. After exit from the outlet —D— the gas ascends a pipe —E— connected with said outlet, and passes into the hollow trunnion —B'—, and thence through the pipe —F— leading from said trunnion.

In the use of the apparatus illustrated, experience has demonstrated that it is desirable to reverse the receptacle —A— and the material within the same in order to insert fresh material at the top and withdraw from the bottom the material sufficiently treated by the gases.

The actuating means —G— for rotating the receptacle —A— and reversing the position of its extremities consists preferably of a gear —$g$— secured to one of the trunnions, a gear —$g'$— supported by brackets —$g^2$— and operated by a crank or other power transmitting means —$g^3$—, and an intermediary gear or gearing —$g^4$—; whereby, upon the rotation of the crank, motion is transmitted from the gear —$g'$— to the gear —$g$—.

—$n$— represents a plunger or stop movable in and out of the gas inlet passage —B— for preventing passage of the gas when the receptacle —A— is reversed and admitting the same after the fresh material has been added.

—H— represents the outlet opening, which is in the normal top of the apparatus —A—, and is closed by a suitably shaped cap —I—.

—J— represents the inlet opening at the normal base of the receptacle, which is closed by a cap —K— securely retained in position by a fastening —L— consisting of a lever —$l$— pivoted to the base of the receptacle and a swinging link —$l'$—. The cap —K— is provided with a pair of perforated plates —$k$— and —$k'$—, which form a continuation of the plates —$d$— and —$d'$— for allowing the escape of the gases.

—M— represents a false top within the receptacle —A— which is movably mounted on a clamping device or screw —N— for preventing destruction of the separate zones of the material during the reversal of the receptacle —A—.

My process is not limited to the apparatus, previously described, although the same is particularly applicable and practicable. It will also be understood that my process may be used in the manufacture of chlorine by means of chlorides under the action of air; the calcination of powdered phosphates; the burning of pyrites; the revivification of lime muds; the manufacture of ferrite of soda; the manufacture of aluminate soda, &c. This process may also be used in the action of a cold gas on a solid body in powder or in small grains, as in the manufacture of chloride of lime by the action of pure or diluted chlorine on the lime, or it may be used in the action of a liquid on powdered solid bodies, as for instance, the caustification of ammoniacal salts by means of lime.

My improved process will be readily understood from the foregoing description and upon reference to the drawing, and it is evident that the same is simple, effective and economical.

Having thus fully described my invention, what I claim as new, and desire to secure by Letters Patent, is—

The herein described process of methodically and continuously treating powdered materials with gases, the same consisting in passing the gas from top to bottom through a body of said material contained within a closed vessel, reversing the ends of the body of said material so that its normal top and bottom ends temporarily become respectively its bottom and top ends, adding fresh material to the normal bottom end of the body of said material when temporarily the top end thereof, removing the material sufficiently treated from the normal top end of the body of said material when temporarily the bottom end thereof, and returning the body of said material to its first normal position, substantially as and for the purpose described.

In testimony whereof I have hereunto signed my name, in the presence of two attesting witnesses, at the city of Brussels, Belgium, this 30th day of August, 1890.

ERNEST SOLVAY.

Witnesses:
R. LUCION,
GREGORY PHELAN.